Patented Mar. 4, 1947

2,416,998

UNITED STATES PATENT OFFICE 2,416,998

CELLULOSE SOLUTION AND METHOD OF MAKING THE SAME

Frank C. Hewitt, Northampton, and Charles Roy Cayen, Easthampton, Mass., assignors, by mesne assignments, to The Aspinook Corporation, Jewett City, Conn., a corporation of Delaware No Drawing. Application March 24, 1944, Serial No. 528,010

2 Claims. (Cl. 252—311)

This invention relates to improvements in cellulosic sols in sodium zincate. One object of the invention is to provide a process for the production of cellulosic sols in which every state of the process is fully controllable, so that in contrast with known methods of producing sols of cellulose in sodium zincate the resulting product can be duplicated. Another object is to provide such a process applicable to a wide range of commercial pulps and fibers as far removed as unbleached sulfite pulp and cotton linters. Another object is to provide such a process in which the use of extremely high or low temperatures is avoided. Another object is to provide a stable cellulosic sol or dispersion in sodium zincate which will be usable in higher concentrations than has formerly been possible without resort to low temperatures in the preparation of the sol. Another object is to provide a cellulosic sol in sodium zincate which will have reducing properties sufficiently marked to permit its use as a discharge for dischargeable dyes, and to act as a means for reducing a vat dye to its leuco stage. Additional objects, as well as the manner in which all these objects are accomplished, will appear from the following description and claims.

It has been known that unmodified cellulose, as well as oxycelluloses produced by the degradation of cellulose with heat or with alkaline sodium hypochlorite, could be dissolved or dispersed in a solution of zinc oxide in dilute sodium hydroxide. (Cf. Davidson, Journal of the Textile Institute, March 1937, pp. T27–44.) The use of unmodified cellulose in the sodium hydroxide-zinc oxide mixture (hereinafter referred to, as is customary, as sodium zincate), requires substantially freezing temperatures in order to obtain any substantial yield. The solution of hypochlorite oxycellulose can be carried on at normal temperature with a good yield, but requires a high molar ratio of ZnO to NaOH and a sodium hydroxide concentration of 3.5N. Concentrated sols of the oxycellulose are not possible under such conditions (Davidson, supra, p. 38) since the resulting sol turns rapidly into a gel and in order to obtain a stable sol it is necessary to reduce the normality of the sodium hydroxide and to employ low temperatures. Cellulose degraded by heat or alkali also requires the use of temperatures at freezing or below to obtain a satisfactory yield. The use of low temperatures is of course a distinct disadvantage in commercial processes.

We have found that by employment of a reducing oxycellulose, such for example as oxycellulose prepared by the action of sulfuric or oxalic acid and sodium or potassium dichromate, complete solution can be brought about at room temperature with a concentration of sodium hydroxide so low that less than 10% of the hypochlorite oxycellulose would dissolve under similar conditions. We have also found that when a sol of oxycellulose is formed in accordance with our invention in sufficiently high concentration so that it tends to turn to a gel on standing, the material is still usable over an extended period since the gel is thixotropic in character, readily returning to sol form on agitation. As far as we are aware a thixotropic gel of cellulosic material has never been noted previously, although thixotropy has been a recognized property of strong hydrous oxide and bentonite sols; and, under special conditions, of gelatin sols. Sols prepared in accordance with the present process will gradually set to a gel, which on even slight agitation will revert to the original sol form and remain in the sol condition under agitation. Quiescence will again restore the gel state, the operation being reversible repeatedly although ultimately the viscosity may increase to the point where the gel state is permanent. Since the degree of agitation necessary is only slight, and since reversion to the sol state is extremely rapid while reversion to a gel occurs only slowly, the material is perfectly suitable for use in textile processes such as printing on fabric by means of engraved rollers. The agitation caused by the transfer rolls in the printing process is sufficient to keep the sol in fluid form.

The preferred manner of degrading the cellulose is to digest it in an aqueous solution of 0.5% sulfuric acid and 0.5% potassium or sodium dichromate at around 100° F. for from 2 to 12 hours depending upon the degree of degradation desired. Neither the proportions nor the temperature are critical, but the figures given are preferred. The pulp may be of any desired grade, ordinary sulfite pulp used in rayon manufacture being satisfactory. A convenient way of handling the pulp during digestion is to enclose it in a perforated cage of resistant metal rotating on a horizontal axis in the acid bath. In general the time of action will be between 6 to 8 hours, since this produces a degree of degradation permitting ready formation of a solution of average viscosity. The pulp preserves its fibrous character after the dichromate treatment. Other known method of producing a reducing type of oxycellulose may be used such, for example, as treatment with periodic, chromic, or dichromic acid.

After digestion the pulp is washed until all traces of acid and dichromate are removed, excess water is extracted, and pulp is dried at a relatively low temperature (say 160° F.) since higher temperatures tend to cause further degradation of the cellulose. After drying, the pulp can be stored indefinitely without undergoing further degradation, an advantage of this process which may be used by preparing stock batches of differing degrees of degradation and blending the different batches to produce a sol of exactly the viscosity desired. It is, however, preferable to have at least the major portion of the batch of substantially the correct degree of degradation for the viscosity desired, since more concentrated sols can be prepared in this way.

The solvent for the pulp is prepared by agitating zinc oxide in strong caustic soda at a temperature above 120° F. (preferably 190°–210° F. as this tends to give a clearer solution) until solution is accomplished. This will take about one hour. The alkaline solution of zinc oxide will be referred to as sodium zincate for convenience although the resulting product is probably not as simple as the name would indicate. The initial proportions of sodium hydroxide and zinc oxide are not critical, as much zinc oxide being usable as is possible without producing cloudiness. This will in general be about 1 part of zinc oxide to 3.2 parts of sodium hydroxide (dry basis), or a molar ratio of about 0.15.

The degraded dry pulp is treated at normal room temperatures (about 70° F.) with the zincate solution diluted for this stage so that its caustic content is about 25% of the water (about 6.25N). As much of the zincate solution is added to the pulp as it will take up, preferably without excess, and the pulp is subjected to the action of a shredding device which may be of the general type used in the preparation of the "crumbs" in rayon manufacture. This constant mixing and shredding is continued for at least one hour in order to insure thorough treatment. A longer treatment with the zincate reduces the viscosity of the final sol but increases its stability.

Cold water (room temperature or somewhat below) is added in sufficient quantity to reduce the normality of the sodium hydroxide (free and combined) to about 2.3N and the whole is thoroughly mixed. The shredded pulp will disperse very rapidly to form a translucent sol which increases in viscosity on standing, reaching stability after several weeks. If the concentration of oxycellulose is not too great any gel formed will, at least for a period sufficient to permit its use, be thixotropic and easily caused to revert to a sol by agitation. No tendency to precipitate zinc oxide or to separate in layers is apparent, both of which difficulties have been inherent in former methods of procedure.

The proportions of the materials used in the process above described are substantially

| | Parts by weight |
|---|---|
| Pulp | 5 |
| Water | 76.5 |
| NaOH (50%) | 16 |
| ZnO | 2.5 |

These proportions may be varied to some extent, but a too concentrated solution of oxycellulose (much above 6%) will cause the formation of gels which become irreversible rather soon and are of little use in textile applications.

The viscosity of the sol can be regulated by varying the time of digestion of the pulp with the acid dichromate, a longer time giving a lower viscosity. Conversely, a longer digestion time permits a higher oxycellulose concentration for the same viscosity. Lowered viscosity also results from an increased reaction period with the zincate before dilution, the two methods of lowering viscosity being to a large degree interchangeable. If it is desired to dilute the sol, this can be done by adding zincate solution of the same concentration as that in the sol, or to a limited extent by adding a solution of sodium hydroxide of the same concentration as the sodium hydroxide in the zincate solution. Dilution with caustic alone should not, however, be carried on so as to bring the cellulose content much below 2%, as precipitation will occur in weak concentrations.

The resulting oxycellulose sol can be precipitated by dilution, strong caustic, acid salts, or various acids, but a mild solution of sulfuric acid is preferred as a precipitant. The oxycellulose sol is capable of use in numerous textile processes with novel effects. It may be noted here, however, that the sol preserves the reducing or discharging character of the oxycellulose to such an extent that, if the sol be printed on a fabric previously dyed with a dischargeable dye, discharge of the dye will be brought about with no necessity for the use of additional discharging agents. If a vat dye be added to the sol the dye will be reduced to its soluble leuco stage without the use of sulphoxylate, hydrosulfite or other additional reducing agent, the later oxidation of the dye to its insoluble state being accomplished as usual.

We claim:

1. A process of forming a cellulose sol which comprises subjecting cellulose to the action of an acid dichromate solution for a time sufficient to degrade the cellulose to the extent desired, washing and drying the degraded cellulose, saturating the degraded cellulose with a solution of sodium zincate having a total sodium hydroxide concentration of substantially 6N, macerating the saturated oxycellulose for a time sufficient to convert it into soluble form, and diluting the macerated mass to bring its sodium hydroxide concentration to substantially 2.5N.

2. A process of forming a sol of a reducing oxycellulose which comprises saturating and intimately mixing a reducing oxycellulose with a solution of sodium zincate having a total sodium hydroxide concentration of substantially 6N and diluting the so-treated oxycellulose to bring the sodium hydroxide concentration to substantially 2.5N.

FRANK C. HEWITT.
CHARLES ROY CAYEN.

REFERENCES CITED

The following references are of record in the file of this patent:

UNITED STATES PATENTS

| Number | Name | Date |
|---|---|---|
| 2,322,427 | Edelstein | June 22, 1943 |
| 2,335,126 | Lilienfeld | Nov. 23, 1942 |

OTHER REFERENCES

High Polymers, vol. V, Cellulose and Cellulose Derivatives, pub. 1943 by Interscience Publishers, Inc., of N. Y., pp. 176 and 178.

Marchall—Article in Jentgen's Kunstseide and Zellwolle, vol. 23, pp. 160–173, May 1941.